(12) United States Patent (10) Patent No.: US 8,761,195 B2
Tiirola et al. (45) Date of Patent: Jun. 24, 2014

(54) SOUNDING REFERENCE SIGNAL ARRANGEMENT

(75) Inventors: Esa Tiirola, Kempele (FI); Kari Pajukoski, Oulu (FI); Kari Hooli, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 1191 days.

(21) Appl. No.: 12/318,765

(22) Filed: Jan. 8, 2009

(65) Prior Publication Data

US 2009/0181687 A1 Jul. 16, 2009

Related U.S. Application Data

(60) Provisional application No. 61/006,364, filed on Jan. 8, 2008, provisional application No. 61/006,901, filed on Feb. 5, 2008.

(51) Int. Cl.
*H04L 12/42* (2006.01)
*H04L 12/403* (2006.01)

(52) U.S. Cl.
USPC ........................................................ 370/450

(58) Field of Classification Search
USPC ........................................................ 370/450
See application file for complete search history.

(56) References Cited

U.S. PATENT DOCUMENTS

| 8,102,809 | B2 * | 1/2012 | Muharemovic et al. ...... 370/330 |
| 2006/0056355 | A1 | 3/2006 | Love et al. |
| 2007/0140165 | A1 | 6/2007 | Kim et al. |
| 2008/0267137 | A1 * | 10/2008 | Dabak et al. .................. 370/336 |
| 2009/0046645 | A1 * | 2/2009 | Bertrand et al. .............. 370/329 |
| 2009/0080569 | A1 * | 3/2009 | Han et al. ...................... 375/316 |
| 2009/0109908 | A1 * | 4/2009 | Bertrand et al. .............. 370/329 |
| 2009/0116434 | A1 * | 5/2009 | Lohr et al. .................... 370/329 |
| 2009/0310549 | A1 * | 12/2009 | Higuchi et al. ............... 370/329 |
| 2010/0067445 | A1 * | 3/2010 | Rinne et al. .................... 370/329 |
| 2010/0091919 | A1 * | 4/2010 | Xu et al. ....................... 375/346 |

FOREIGN PATENT DOCUMENTS

| CN | 101087159 A | 12/2007 |
| EP | 1708523 A1 | 10/2006 |
| RU | 2304840 C1 | 8/2007 |
| WO | 2007053403 A2 | 5/2007 |

OTHER PUBLICATIONS

"Cyclic Shift Hopping and DM RS Signaling", Nokia Siemens Networks, Nokia, XP-002494363, 3GPP TSG RAN WG1 Meeting #49 Kobe, Japan, May 7-11, 2007, 4 pages.
"On Construction and Signaling of RACH Preambles", Nokia, Siemens, XP-002494365, 3GPP TSG Ran WG1 #48bis, St. Julian's Malta, Mar. 26-30, 2007, 2 pages.

(Continued)

*Primary Examiner* — Shaq Taha
(74) *Attorney, Agent, or Firm* — Squire Sanders (US) LLP

(57) ABSTRACT

A method, apparatus, and computer program embodied on a computer-readable medium to create an uplink message to be transmitted to a base station, the created uplink message comprises a sounding reference signal based on accessed data. An uplink scheduling grant signal is received via downlink, from the base station, in response to the transmission of the uplink message. An uplink data transmission is transmitted to the base station responsive to the received uplink scheduling grant signal.

22 Claims, 14 Drawing Sheets

(56) References Cited

OTHER PUBLICATIONS

"Uplink Scheduling Request for LTE", Nokia Siemens Networks, Nokia, R1-073016, 3GPP TSG RAN WG1 #49bis, Orlando, USA, Jun. 25-29, 2007, 3 pages.

"Assignment Scheme for Sounding Reference Signals in E-UTRA Uplink", NTT DoCoMo, Fujitsu, Institute for Infocomm Research, R1-074806, 3GPP TSG RAN WG1 Meeting #51, Jeju, Korea, Nov. 5-9, 2007, (Original R1-070091), 4 pages.

"DFT Size for Uplink Transmission", Ericsson, R1-070461, TSG-RAN WG1 #47bis, Sorrento, Italy, Jan. 15-19, 2007, 3 pages.

"Sounding Reference Signal Assignments in E-UTRA Uplink", Texas Instruments, R1-072849, 3GPP TSG RAN WG1 #49bis, Orlando, USA, Jun. 25-29, 2007, 7 pages.

"SRS Bandwidth Selection", Nokia Siemens Networks, R1-080291, 3GPP TSG RAN WG1 Meeting #51bis, Seville, Spain, Jan. 14-18, 2008, 6 pages.

Written Opinion and Search Report; Issued from Hungarian Intellectual Property Office for corresponding Application No. 201004579-7.

Notice of Allowance dated Oct. 25, 2011 issued in corresponding Russian Patent Application No. 2010132845/07 (046487).

Official Action dated May 24, 2012 issued in corresponding Japanese Patent Application No. 2010541178.

Office Action dated Sep. 24, 2012 issued in corresponding Chinese Patent Application No. 200980108227.5.

Nokia Siemens Networks et al: "UL sounding"; R1-072296; 3GPP TSG RAN WG1 Meeting #49, Kobe, Japan, May 7-11, 2007; pp. 1-4.

3GPP TS 36.211 V8.1.0 (Nov. 2007); "3rd Generation Partnership Project; Technical Specification Group Radio Access Network; Evolved Universal Terrestrial Radio Access (E-UTRA); Physical Channels and Modulation (Release 8)"; 3GPP, 650 Route des Lucioles—Sophia Antipolis, Valbonne-France; pp. 1-59.

* cited by examiner

FIGURE 3

SRS Bandwidths 300

|  | (# of RBs | SRS Bandwidth (# of RBs) | | | |
|---|---|---|---|---|---|
|  |  | #1 | #2 | #3 | #4 |
| 20 MHz | 100 | 4 | 24 | 48 | 96 |
| 20 MHz | 100 | 4 | 20 | 40 | 80 |
| 15 MHz | 75 | 4 | 36 | 72 |  |
| 15 MHz | 75 | 4 | 16 | 32 | 64 |
| 10 MHz | 50 | 4 | 12 | 24 | 48 |
| 10 MHz | 50 | 4 | 20 | 40 |  |
| 5 MHz | 25 | 4 | 20 |  |  |
| 3 MHz | 15 | 4 | 12 |  |  |
| 1.6 MHz | 6 | 4 |  |  |  |

First Bandwidth Scheme 310

Second Bandwidth Scheme 320

FIGURE 4

SRS Bandwidths Table 400

| # of RBs | Allowed SRS BW? |
|---|---|
| 1 | No |
| 2 | Yes |
| 3 | No |
| 4 | Yes |
| 5 | No |
| 6 | Yes |
| 8 | Yes |
| 9 | No |
| 10 | Yes |
| 12 | Yes |
| 15 | No |
| 16 | No |
| 18 | Yes |
| 20 | Yes |
| 24 | Yes |
| 25 | No |
| 27 | No |
| 30 | Yes |
| 32 | Yes |
| 36 | Yes |
| 40 | Yes |
| 45 | No |
| 48 | Yes |
| 50 | Yes |
| 54 | Yes |
| 60 | Yes |
| 64 | Yes |
| 72 | Yes |
| 75 | No |
| 80 | Yes |
| 81 | No |
| 90 | Yes |
| 96 | Yes |
| 100 | Yes |
| 108 | Yes |

FIGURE 5

Allowed SRS BW MAX CS Separation Table 500

| # of RBs | Allowed SRS BW | Allowed SRS BW MAX CS Separation |
|---|---|---|
| 1 | | |
| 2 | Yes | |
| 3 | | |
| 4 | Yes | Yes |
| 5 | | |
| 6 | Yes | |
| 8 | Yes | Yes |
| 9 | | |
| 10 | Yes | |
| 12 | Yes | Yes |
| 15 | | |
| 16 | Yes | Yes |
| 18 | Yes | |
| 20 | Yes | |
| 24 | Yes | Yes |
| 25 | | |
| 27 | | |
| 30 | Yes | |
| 32 | Yes | Yes |
| 36 | Yes | Yes |
| 40 | Yes | Yes |
| 45 | | |
| 48 | Yes | Yes |
| 50 | Yes | |
| 54 | Yes | |
| 60 | Yes | Yes |
| 64 | Yes | Yes |
| 72 | Yes | Yes |
| 75 | | |
| 80 | Yes | Yes |
| 81 | | |
| 90 | Yes | |
| 96 | Yes | Yes |
| 100 | Yes | Yes |
| 108 | Yes | Yes |

FIGURE 6

Transmission Bandwidth Configuration Table 600

| Channel Bandwidth BW$_{channel}$ (MHz) | 1.4 | 1.6 | 3 | 3.2 | 5 | 1. | 15 | 20 |
|---|---|---|---|---|---|---|---|---|
| FDD mode | 6 | n/a | 15 | n/a | 25 | 50 | 75 | 100 |
| TDD Mode (frame structure type 1) | [6] | TBD | [15] | TBD | 25 | 50 | 75 | 100 |
| TDD Mode (frame structure type 2) | TBD | [7] | TBD | [16] | 25 | 50 | 75 | 100 |

FIGURE 7

SRS Bandwidth Tree 700

| 48 RUs | 710 | | | | | | | | | | | |
|---|---|---|---|---|---|---|---|---|---|---|---|---|
| 24 RUs | 720 | | | | | | 720 | | | | | |
| 12 RUs | 730 | | | 730 | | | 730 | | | 730 | | |
| 4 RUs | 740 | 740 | 740 | 740 | 740 | 740 | 740 | 740 | 740 | 740 | 740 | 740 |

Frequency

Expectation value of SINR estimator as function of input SINR,
bandwidth of interest: 2RB (360 kHz),
Sounding signal bandwidth: 2RBs and 4 RBs.

Standard deviation of SNR estimator as function of input SINR.
Bandwidth of interested: 2RB (360 kHz),
Sounding signal bandwidth 2 RBs and 4 RBs.

1100

SOUNDING REFERENCE SIGNAL ARRANGEMENT

This application claims priority from U.S. Provisional Patent Application No. 61/006,634, filed on Jan. 8, 2008, and U.S. Provisional Patent Application No. 61/006,901 filed on Feb. 5, 2008. The disclosures of the prior applications are hereby incorporated by reference in their entirety.

FIELD

Some of the embodiments relate to an uplink (UL) transmission of a universal mobile telecommunications system (UMTS) terrestrial radio access network (UTRAN) long term evolution (LTE). More specifically, some of the embodiments relate to sounding reference signal (SRS) transmission and configuration.

BACKGROUND

Wireless communication networks are well known and constantly evolving. For example, universal mobile telecommunications system (UMTS) is one of the third-generation (3G) cell phone technologies. Currently, the most common form of UMTS uses wideband code division multiple access (W-CDMA) as the underlying air interface, as standardized by the third generation partnership project (3GPP).

Currently, UMTS networks worldwide are being upgraded to increase data rate and capacity for downlink packet data. In order to ensure a further competitiveness of UMTS, various concepts for UMTS long term evolution (LTE) have been investigated to achieve a high-data-rate, low-latency and packet optimized radio access technology.

3GPP LTE (long term evolution) is the name given to a project within the Third Generation Partnership Project to improve the UMTS mobile phone standard to cope with future requirements. Goals of the project include improving efficiency, lowering costs, improving services, making use of new spectrum opportunities, and better integration with other open standards. The LTE project is not a standard, but it will result in the new evolved release 8 of the UMTS standard, including mostly or wholly extensions and modifications of the UMTS system.

A characteristic of so-called "4G" networks including Evolved UMTS is that they are fundamentally based upon transmission control protocol/internet protocol (TCP/IP), the core protocol of the Internet, with built-on higher level services such as voice, video, and messaging.

A sounding reference signal (SRS) may be typically transmitted with a wide bandwidth for a node B (i.e., a base station) to find the best resource unit (RU) for a transmitting from a user equipment (UE). However, due to the restrictions on the maximum UE transmission power, the channel quality indication (CQI) measurement accuracy may be degraded when the SRS signal is degraded, such as when a UE located near edge of the cell transmits the SRS. This degradation of the SRS may cause errors to arise in the optimum RU assignment and in the modulation and coding scheme (MCS) selection. Therefore, improvements in the transmission of the SRS from the UE helps to achieve the maximum user throughput. Accordingly, the SRS may be designed to enable channel aware scheduling and fast link adaptation for PUSCH for UL data transmissions. The SRS is also used as a reference signal (RS) for closed loop power control (PC) for both physical uplink shared channel (PUSCH) and a physical uplink control channel (PUCCH).

In the current LTE, aspects of the SRS are semi-statically configurable by the UE, for example as part of a radio resource control (RRC) signaling. In particular, the UE may specify various attributes as part of an uplink communications to the node B. For example, changes in the SRS may be used to modify the bandwidth (BW) used by the UE, such as to request for either a narrowband or a wideband SRS BW for a given operating bandwidth. When adjusting the bandwidth, the SRS transmission ideally should not puncture the PUCCH region, which may also occur with a persistent PUSCH.

The UE may also adjust the duration of the SRS. For example, the SRS may be defined as being either "one shot" transmissions or indefinite transmissions that is valid until otherwise disabled or until the session ends. The UE may further adjust the period for the SRS. For example, the period may be 2, 5, 10, 20, 40, 80, 160, or X ms. The UE may further adjust the SRS to include a cyclic shift of 3 bits, as described in greater detail below.

Also, it has been decided that a cyclic shift of the SRS sequence is indicated by 3-bits. It may be possible to indicate $2^3$, or 8, different cyclic shift values using the 3-bits. However, the question that arises is how to maximize the cyclic shift separation between the SRS resources.

Another problem that arises due to the above-described UE-based customization of the SRS is supporting code-tree based bandwidth assignment with maximized cyclic shift separation.

To provide an efficient assignment of SRSs with different transmission bandwidths, one conventional scheme presents a bandwidth assignment based on orthogonal variable spreading factor (OVSF) code assignment with a tree structure. Although the present discussion refers to OVSF, it should be appreciated that other tree-based assignments, such as Walsh codes are known and may used in the alternative.

OVSF and other tree-based codes may support both hopping-based and localized-based multiplexing for SRSs with a narrower transmission bandwidth than the system bandwidth in order to maximize the user throughput performance in various cell deployment scenarios. Moreover, the conventional scheme may be adapted to achieve an efficient SRS hopping method based on the switching of branches of the OVSF code tree. However, this conventional scheme does not take into account the current SRS assumptions made in 3GPP. For example, the scheme may not work properly if the SRS transmission puncture the PUCCH region or if certain BW options are allowed for SRS.

SUMMARY

Some of the embodiments been developed in response to the present state of the art, and in particular, in response to the problems and needs in the art that have not yet been fully solved by currently available communication system technologies. Accordingly, some of the embodiments been developed to provide a sounding reference signal arrangement method, apparatus, and a computer program embodied on a computer-readable medium.

According to one embodiment, a method is provided to include creating an uplink message to be transmitted to a base station, the created uplink message comprises a sounding reference signal based on accessed data. The method includes receiving uplink scheduling grant signal via downlink from the base station in response to the transmission of the uplink message. The method includes transmitting to the base station uplink data transmission responsive to the received uplink scheduling grant signal.

According to another embodiment, a method is provided to include receiving, from a mobile station, an uplink message comprising a sounding resource signal allocation bandwidth. The method includes transmitting uplink scheduling grant signal via downlink to the mobile station. The method includes receiving, from the mobile station, uplink data transmission responsive to the transmitted uplink scheduling grant signal.

According to another embodiment, an apparatus is provided to include a transmitter configured to transmit to a base station a created uplink message comprising a sounding reference signal. The apparatus is also provided to include a receiver configured to receive uplink scheduling grant signal via downlink from the base station. The transmitter is further configured to transmit to the base station uplink data transmission responsive to the received uplink scheduling grant signal.

According to another embodiment, an apparatus is provided to include a receiver configured to receiver an uplink message comprising a sounding resource signal allocation bandwidth. The apparatus includes a transmitter configured to transmit uplink scheduling grant signal via downlink to a mobile station. The receiver is further configured to receive, from the mobile station, uplink data transmission responsive to the transmitted uplink scheduling grant signal.

According to another embodiment, an apparatus is provided to include a transmitting means for transmitting to a base station a created uplink message comprising a sounding reference signal. The apparatus also includes a receiving means for receiving uplink scheduling grant signal via downlink from the base station. The transmitting means for transmitting transmits to the base station uplink data transmission responsive to the received uplink scheduling grant signal.

According to another embodiment, an apparatus is provided to include a receiving means for receiving an uplink message comprising a sounding resource signal allocation bandwidth. The apparatus also includes a transmitting means for transmitting uplink scheduling grant signal via downlink to a mobile station. The receiving means for receiving, from the mobile station, uplink data transmission responsive to the transmitted uplink scheduling grant signal.

According to another embodiment, a computer program embodied on a computer-readable medium is provided to be configured to control a process to perform a method. The method includes creating an uplink message to be transmitted to a base station comprising a sounding reference signal based on accessed data. The method includes receiving uplink scheduling grant signal via downlink from the base station in response to the transmission of the uplink message. The method also includes transmitting to the base station uplink data transmission responsive to the received uplink scheduling grant signal.

According to another embodiment, a computer program embodied on a computer-readable medium is provided to be configured to control a process to perform a method. The method includes receiving an uplink message comprising a sounding resource signal allocation bandwidth. The method includes transmitting uplink scheduling grant signal via downlink to a mobile station. The method includes receiving, from the mobile station, uplink data transmission responsive to the transmitted uplink scheduling grant signal.

BRIEF DESCRIPTION OF THE DRAWINGS

In order for the advantages of the embodiments to be readily understood, a more particular description of the embodiments briefly described above will be rendered by reference to specific embodiments that are illustrated in the appended drawings. Understanding that these drawings depict only typical embodiments and are not therefore to be considered to be limiting of its scope, the embodiments will be described and explained with additional specificity and detail through the use of the accompanying drawings, in which:

FIG. 3 is a SRS bandwidth allocation in accordance with an embodiment;

FIG. 4 is an SRS bandwidth allocation configuration in accordance with an embodiment;

FIG. 5 is an SRS bandwidth allocation configuration in accordance with an embodiment;

FIG. 6 is a SRS transmission bandwidth configuration table for various transmissions according to channel bandwidth;

FIG. 7 is an SRS bandwidth allocation in accordance with an embodiment;

DETAILED DESCRIPTION OF THE PREFERRED EMBODIMENTS

It will be readily understood that the components of the present embodiments, as generally described and illustrated in the figures herein, may be arranged and designed in a wide variety of different configurations. Thus, the following more detailed description of the embodiments of the apparatus, system, and method of the embodiments, as represented in the attached figures, is not intended to limit the scope of the embodiments, as claimed, but is merely representative of selected embodiments.

The features, structures, or characteristics of the embodiments described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

In response to the above described and other needs, embodiments provide an arrangement for sounding reference signals supporting maximum cyclic shift separation between SRS resources. In another embodiment, an equation for calculating the actual cyclic shift value for different SRS bandwidths, along with an efficient SRS signaling scheme is disclosed. In particular, the SRS arrangement in some of the embodiments can be built using three criteria that SRS signals are based on existing demodulation reference signal (DM RS) signals. As described in LTE, release 8, a maximum cyclic shift separation may be provided for 8 parallel cyclic shifts, and support for code-tree-based bandwidth assignment is provided. Moreover, the SRS transmission in other embodiments can prevent "puncturing" the PUCCH region or otherwise attempt to transmit over a RB reserved for the PUCCH. Similarly, other embodiments may prevent the SRS from puncturing persistent PUSCH allocations.

Figure 1:
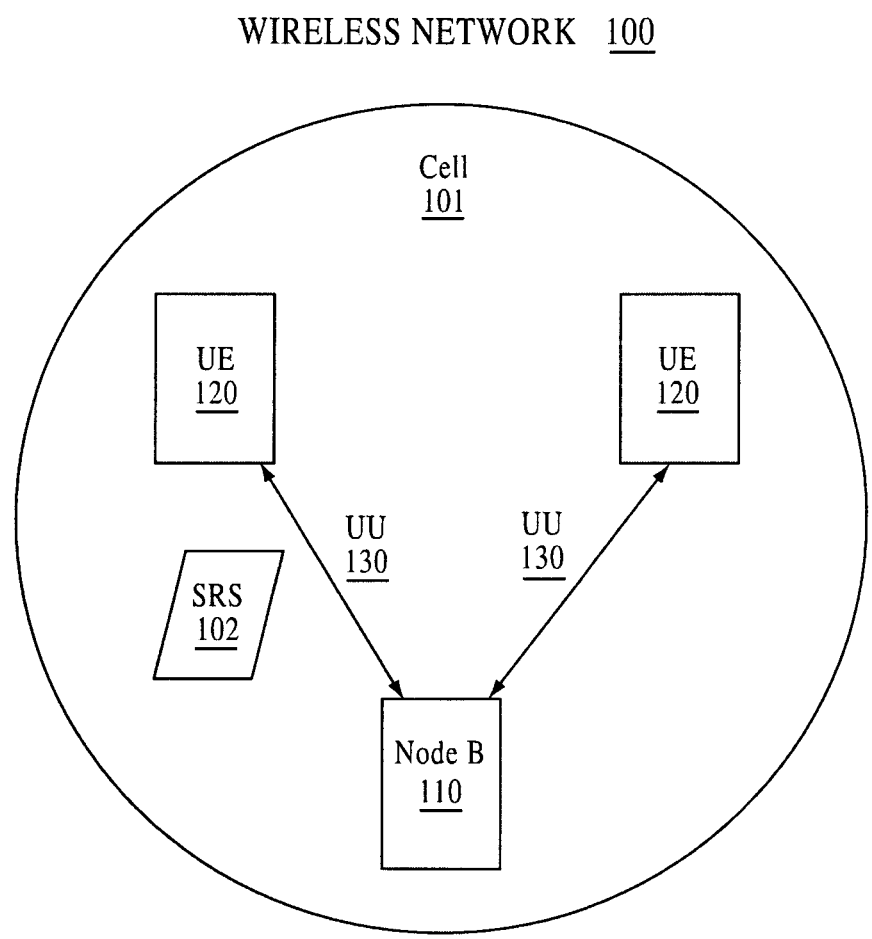
FIG. 1 is a high level schematic diagram of a UMTS system.

FIG. 1 illustrates a UMTS system 100. In particular, the UMTS system 100 includes one or more node B's 110 that define one or more cells 101, and multiple user equipments (UEs) 120 associated with one or more of the cells. The radio interface between the UE 120 and the Node-B 110 is called UU 130.

The node B 110 (also known in the LTE as enhanced node B or eNB) is a term used in UMTS to denote the BTS (base transceiver station). In contrast with global systems for mobile communications (GSM) base stations, node B 110 uses WCDMA as air transport technology. The node B 110 includes radio frequency transmitter(s) and receiver(s) to communicate directly with the mobile stations, i.e. UEs 120, which move freely around it. In this type of cellular networks, the UE 120 may not communicate directly with each other but may have to communicate with the node Bs 110.

Traditionally, the node Bs 110 have minimum functionality, and are controlled by an RNC (Radio Network Controller). However, this is changing with the emergence of High Speed Downlink Packet Access (HSDPA), where some logic (e.g. retransmission) is handled on the node B 110 for lower response times.

The utilization of WCDMA technology in the LTE allows cells belonging to the same or different node Bs 110 and even controlled by different RNC to overlap and still use the same frequency (in fact, the whole network can be implemented with just one frequency pair) to achieve soft handovers between the cells.

Since WCDMA often operates at higher frequencies than GSM, the cell range is considerably smaller compared to GSM cells, and, unlike in GSM, the cells' size is not constant (a phenomenon known as "cell breathing"). This requires a larger number of node Bs 110 and careful planning in 3G (UMTS) networks. However, the power requirements on the node Bs 110 and the UE 120 (user equipment) are much lower.

Because LTE is enhanced with a radio technique called E-UTRAN, node Bs (e.g. eNB) 110 may be capable of handling radio resource management and radio access control within a cell in which the apparatus provides coverage. The apparatus may be, for example an eNB, a base station or a radio network controller (RNC). Therefore, node Bs 110 may perform tasks related to resource management, admission control, scheduling and measurements related to channel quality.

The node Bs 110 may further interface with UE 120 via radio link connections 130. The physical layers of the LTE includes orthogonal frequency division multiple access (OFDMA) and multiple-input and multiple-output (MIMO) data transmission. For example, in LTE, OFDMA may be used for downlink transmission and single carrier frequency division multiple access (SC-FDMA) may be used for uplink transmission. Because the transmission frequency band may be divided into multiple sub-carriers orthogonal to each other in OFDMA, each sub-carrier may transmit data to a specific UE 120. As a result, multiple access may be aceived by assigning subsets of sub-carriers to individual UEs 120. However, SC-FDMA may be a type of discrete Fourier transform (DFT) pre-coded OFDMA scheme. As such, SC-FDMA may utilize single carrier modulation, orthogonal frequency domain multiplexing and frequency domain equalization.

The node B 110 typically includes an antenna (not depicted) connected to several components, including power amplifiers and digital signal processors (also not depicted). The node B 110 can serve several cells 101, also called sectors, depending on the configuration and type of antenna.

Continuing with FIG. 1, the UE 120 roughly corresponds to the mobile station in GSM systems and may be any device used directly by an end user to communicate. For example, the UE 120 can be a hand-held telephone, a card in a laptop computer, or other device. The UE 120 connects to the base station, the above-described Node-B 110 as specified in the 36-series of specifications. It roughly corresponds to the mobile station in GSM systems.

Furthermore, as will be described in further detail below, the UEs 120 transmit and receive several messages to the node 110 B. One of the messages being transmitted, as discussed below, includes an SRS 102. The SRS 102 may be configured based on data received from the node B 110 or by a user interface or both. As a result, the message including the SRS 102 can be transmitted to the node Bs 110 from the UEs 120.

The UE 120 typically handles the tasks towards the core network, including: mobility management, call control, session management, and identity management. Generally, the corresponding protocols are transmitted transparently via a Node-B 110, such that the Node-B 110 does not change, use or understand the protocol information. The UMTS back-end becomes accessible via a variety of means, such as a GSM/UMTS radio network (GSM edge radio access network (GERAN), UMTS terrestrial radio access network (UTRAN), and evolved universal terrestrial radio access network (E-UTRAN)), WiFi, ultra mobile broadband (UMB) and worldwide interoperability for microwave access (WiMAX). Users of non-UMTS radio networks may be provided with an entry-point into the IP network, with different levels of security depending on the trustworthiness of the network being used to make the connection. Users of GSM/UMTS networks may use an integrated system where all authentication at every level of the system may be covered by a single system. However, users may access the UMTS network via WiMAX and other similar technologies to handle the WiMAX connection one way, for example, authenticating themselves via a media access control (MAC) or electronic serial number (ESN) address and the UMTS link-up another way.

In LTE, Release 8, the air interface, called the evolved universal terrestrial radio access (E-UTRA) could be used by UMTS operators deploying wireless networks. While the E-UTRA is still being refined, the current E-UTRA systems use orthogonal frequency division multiple access (OFDMA) for the downlink (tower to handset) and Single Carrier frequency division multiple access (SC-FDMA) for the uplink and employs multiple-input/multiple-output (MIMO) with up to four antennas per station. The channel coding scheme for transport blocks is turbo coding and a contention-free quadratic permutation polynomial (QPP) turbo code internal interleaver.

The use of orthogonal frequency division multiplexing (OFDM), a system where the available spectrum is divided into thousands of very thin carriers, each on a different frequency, each carrying a part of the signal, enables E-UTRA to be much more flexible in its use of spectrum than the older CDMA based systems used in the 3G protocols. CDMA networks typically require large blocks of spectrum to be allocated to each carrier, to maintain high chip rates, and thus maximize efficiency. OFDM has a Link spectral efficiency greater than CDMA, and when combined with modulation formats such as 64 QAM, and techniques as MIMO, E-UTRA is typically more efficient than W-CDMA with high-speed downlink packet access (HSDPA) and high-speed uplink packet access (HSUPA).

In the LTE, version 8, the subcarrier spacing in the OFDM downlink is 15 kHz and there is a maximum of 2048 subcarriers available. Mobile devices must be capable of receiving all 2048 subcarriers but a base station need only support transmitting 72 subcarriers. The transmission is divided in time into time slots of duration 0.5 ms and subframes of duration 1.0 ms. A radio frame is 10 ms long. Supported modulation formats on the downlink data channels are quadrature phase-shift keying (QPSK), 16 quadrature amplitude modulation (QAM) and 64 QAM.

Continuing with the current specification for the uplink, multiplexing SC-FDMA is used, and QPSK or 16 QAM (64 QAM optional) modulation. SC-FDMA is used because it has a low peak-to-average power ratio (PAPR). Each mobile device may include at least one transmitter. Through virtual MIMO/Spatial division multiple access (SDMA), system capacity in the uplink direction can be increased depending on the number of antennas at the base station.

In particular, LTE uplink transmission scheme typically uses SC-FDMA. While OFDMA may be seen optimum to fulfill the LTE requirements in downlink, OFDMA properties are less favorable for the uplink. This is mainly due to weaker peak-to-average power ratio (PAPR) properties of an OFDMA signal, resulting in worse uplink coverage. Thus, the LTE uplink transmission scheme for frequency division multiplexing (FDD) and time division duplexing (TDD) mode is based on SC-FDMA (single carrier frequency division multiple access) with cyclic prefix. SC-FDMA signals have better PAPR properties compared to an OFDMA signal, and the PAPR characteristics are important for cost-effective design of UE power amplifiers. Still, SC-FDMA signal processing has some similarities with OFDMA signal processing, so parameterization of downlink and uplink can be harmonized.

There are different possibilities how to generate an SC-FDMA signal. For example, when discrete fourier transform spread orthogonal frequency division multiplexing (DFT-S-OFDM) has been selected for E-UTRA, a size-M DFT is first applied to a block of M modulation symbols. Then, QPSK, 16 QAM and 64 QAM are used as uplink E-UTRA modulation schemes, the latter being optional for the UE 120. The DFT transforms the modulation symbols into the frequency domain. The result is mapped onto the available sub-carriers. In E-UTRA uplink, only localized transmission on consecutive sub-carriers is allowed. An N point inverse fast fourier transform (IFFT), where N>M is then performed as in OFDM, followed by the addition of the cyclic prefix and parallel to serial conversion.

The DFT processing is, therefore, the fundamental difference between SCFDMA and OFDMA signal generation. This is indicated by the term DFT-spread-OFDM. In an SC-FDMA signal, each sub-carrier used for transmission includes information of all transmitted modulation symbols, since the input data stream has been spread by the DFT transform over the available sub-carriers. In contrast to this, each sub-carrier of an OFDMA signal only carries information related to specific modulation symbols.

Similarly, in SC-FDMA Parameterization, the E-UTRA uplink structure is similar to the downlink. For example, an uplink radio frame consists of 20 slots of 0.5 ms each, and 1 subframe consists of 2 slots. In uplink, data is allocated in multiples of one resource block. Uplink resource block size in the frequency domain is 12 sub-carriers, i.e., the same as in downlink. However, not all integer multiples are allowed in order to simplify the DFT design in uplink signal processing, and typically, only factors 2, 3, and 5 are allowed. The uplink transmission time interval is 1 ms (same as downlink).

User data is carried on the physical uplink shared channel (PUSCH) that is determined by the starting resource blocks, transmission bandwidth and the frequency hopping pattern in the case when PUSCH hopping is enabled. The physical uplink control channel (PUCCH) carries uplink control information in the absence of UL data, e.g., CQI reports and ACK/NACK information related to data packets received in the downlink (in the presence of UL data, control signals are transmitted on PUSCH time multiplexed with UL data). The PUCCH is transmitted on a reserved frequency region in the uplink.

In the uplink reference signal structure, uplink reference signals are used for channel estimation in the receiver of node B 110 to demodulate control and data channels. On the other hand, the reference signals provide channel quality information as a basis for scheduling decisions in the base station (i.e. node B 110), also called channel sounding. The uplink reference signals are based on CAZAC (constant amplitude zero auto correlation) sequences or computer search based ZAC sequences.

For uplink physical layer procedures with E-UTRA, the uplink physical layer procedures may be needed. For example, with non-synchronized random access, the random access may be used to request initial access, as part of handover, when transiting from idle to connected, or to reestablish uplink synchronization. Similarly, if multiple random access channels can be defined in the frequency domain within one access period in order to provide a sufficient number of random access opportunities.

The random access procedure uses open loop power control with power ramping similar to WCDMA. After sending the preamble on a selected random access channel, the UE 120 waits for the random access response message. If no response is detected then another random access channel is selected and a preamble is sent again.

For uplink scheduling, the scheduling of uplink resources is done by node B 110. The node B 110 assigns certain time/frequency resources to the UEs 120 and informs UEs 120 about which transmission formats to use. Scheduling decisions affecting the dynamically scheduled uplink are communicated to the UEs 120 via the PDCCH in the downlink. Higher layer signaling can be used as well, e.g., in the case of persistent scheduling. The scheduling decisions may be based on Quality of Service (QoS) parameters, UE buffer status, uplink channel quality measurements, UE capabilities, UE measurement gaps, etc.

Uplink link adaptation methods, transmission power control, adaptive modulation and channel coding rate, and adaptive transmission bandwidth can be used. Similarly, uplink timing control may be needed to time align the transmissions from different UEs 120 with the receiver window of the node B 110. The node B 110 sends the appropriate timing-control commands to the UEs 120 in the downlink, commanding the UEs 120 to adapt respective transmit timing. For hybrid automatic repeat-request (ARQ), the node B 110 may request retransmissions of incorrectly received data packets.

The 3.9-generation mobile telephone technology provides a digital mobile phone system that is based on 3G but with expanded capabilities close to the expectations of 4G. Feasibility and standardization are being studied with the objective of achieving a smooth transitional link between the current 3G and future 4G.

Referring now to FIG. 3, a SRS arrangement 300 in accordance with an embodiment is presented. For example, FIG. 3 illustrates an embodiment of generating an SRS bandwidth tree. In particular, FIG. 3 illustrates a subset of the supported SRS bandwidths in accordance with some embodiments. In all cases of the SRS arrangement 300, a minimum SRS bandwidth is limited to be four RBs. Furthermore, with these specific examples, two to four SRS bandwidth options are provided for channel bandwidths larger than 1.6 MHz.

Continuing with FIG. 3, the SRS arrangement 300 optionally includes (at least) two alternative sets of SRS bandwidths are proposed for each of the larger operation bandwidths, such as bandwidths greater than 10 MHz. For example, first bandwidth 310 has larger room for PUCCH and persistent PUSCH and leaves a maximum SRS bandwidth of about 80% of the total BW. In contrast, a second set of SRS bandwidths 320 may be configured with smaller room for PUCCH and persistent PUSCH, and has maximum SRS bandwidth of up to 96% of the total BW. The first bandwidth 310 may be used in embodiments due to the greater room reserved for PUCCH and for persistent PUSCH. It is also noted that the final decision on the number of SRS bandwidth schemes may depend on the handling of dynamically varying PUCCH bandwidth (BW), as described in greater detail below.

In particular, the actual amount of cyclic shift in symbols may be calculated according to Equation 1, below relates to a time domain generation of the cyclic shifts.

$$\text{Cyclic\_shift\_symbols\_SRS} = \frac{\text{cyclic\_shift\_value\_SRS} \times \text{SRS\_length}}{8} \quad \text{(Eq. 1)}$$

where the possible cyclic shift values (cyclic_shift_value_SRS) are, 0, 1, . . . , and 7. Corresponding cyclic shifts can be generated by utilizing the basic properties of discrete Fourier transformation; a cyclic shift of 1 can be generated by multiplying the nth element of the sequence discrete Fourier transformation with exp(j2π ln/N), where j=sqrt(−1) and N is the length of sequence. Thus, the cyclic shift of Equation 1 can be realized in frequency domain by multiplying the nth element of the SRS sequence discrete Fourier transformation with exp(j2πn×Cyclic_shift_symbols_SRS/SRS_length)=exp(2πn×cyclic_shift_value_SRS/8).

More generally, it can be seen in the SRS bandwidth arrangement 300 illustrated in FIG. 3 that the SRS signaling dealing with BW allocation and cyclic shift assignment may be based on the following properties:

1-2 (N) bits included to signal the selected SRS bandwidth;
C bits included to signal the bandwidth position in the code tree;
Three bits included to signal the selected cyclic shift for SRS signals of different bandwidth; and
Possibly, also include M bits to indicate the frequency position of the code-tree.

As described above, an SRS arrangement may be generated based on three criteria. For example, the SRS signals may be based on existing DM RS signals, as defined by LTE, release 8. In particular, as discussed above, in the general description of the LTE of the 3GPP, efficient implementation of DFT-S-OFDM is better achieved by requiring that the size of the discrete Fourier transforms (DFT), which corresponds to the number of allocated RUs*12, is factorized into a small number of prime numbers. The DFT in the LTE sizes are limited to multiples of the primes 2, 3 and 5. With respect to the SRS, the recent version of the LTE protocols further include the requirement that the repetition factor (RPF) of 2 may always used to allow DM RS sequences to be reused with SRS.

Taking these additional requirements into account, examples of the supported bandwidth options in this embodiment are listed in Table 400 in FIG. 4. In particular, Table 400 includes a column of possible PUSCH resource allocation size in terms of resource blocks (RB) and a second column indicating that a corresponding SRS BW may be allowed in view of the requirements specified above. For example, bandwidth allocations with odd number of RBs are not supported with SRS due to the requirement that one of the RPFs equals 2. It should be appreciated, however, that table 400 in FIG. 4 is exemplary in view of the above-described conditions, and that additional SRS bandwidth sizes may be used according to the additional/changed requirements as specified for future communications.

In addition, the current LTE specifies that a maximum cyclic shift separation is provided for eight parallel cyclic shifts. In particular, as described above, cyclic shift of the SRS sequence is currently indicated by 3 bits. However, conventional techniques that use 3-bits to represent the cyclic shift do not maximize the cyclic shift separation between the SRS resources.

Therefore, in another embodiment, the SRS length may depend on the SRS bandwidth, which is a multiple of number of RBs that consist of twelve frequency pins. The sequence length is, therefore, given as 12/RPF multiplied by the number of RUs (RPF=2). A maximum separation between eight cyclic shifts, therefore, results in an SRS sequence length that is divisible by 8, which occurs when the SRS BW is a multiple of 4 RBs. Accordingly Table 500 in FIG. 5 further modifies Table 400 to accept only those numbers of RBs that are divisible by 8. As a result, Table 500 may designate acceptable SRS bandwidths that would support eight simultaneous resources to achieve the desired maximum cyclic shift separation, as described above in Equation 1.

Referring now to the third criteria listed above for a desired SRS configuration, it is further desirable to provide support for a code-tree-based bandwidth assignment. In particular, as described above, a narrowband and a wideband SRS BW may be supported for a given operating bandwidth. Different operation BWs of E-UTRA are listed in the top row of Table 600 in FIG. 6 and these correspond to transmission bandwidth configuration $N_{EA}$ in E-UTRA channel bandwidths. In accordance with the above described conditions, when considering the wideband SRS, the SRS bandwidth preferable upper-bounded with the number of RBs in the given channel bandwidth, minus two RBs that are reserved for PUCCH, thereby helping to protect from a puncture of the PUCCH region by the SRS transmission.

Referring now to Table 700 in FIG. 7, compatibility with the OVSF-based code assignment may be also taken into account when selecting the SRS bandwidths. In particular, Table 700 illustrates an exemplary configuration for SRS bandwidths in which the size of a higher row, such as row 710, (as provided in the left column), is evenly divisible by any of the smaller SRS bandwidths 720, 730, and 740 in any of the lower rows. As a result, the support for the tree-based bandwidth assignment may be achieved since every larger BW option is divisible by any of the narrower BW option.

Furthermore, compatibility with an OVSF based code is improved through the above-described characteristics for the SRS allocations achieved according to the principles of the embodiment. In particular, in addition to support a code-tree, the present SRS allocation configurations are built using existing DM RS signals while providing maximum cyclic shift separation for 8 parallel cyclic shifts.

Some of the embodiments provide maximum cyclic shift separation between adjacent Cyclic Shift (CS) resources while supporting code-tree based bandwidth assignment for signaling savings. At the same time, the existing DM RS can continue to be used to avoid adding additional sounding-only reference signals. At the same time, the embodiments disclosed herein provide optimized estimation accuracy.

Figure 10A:
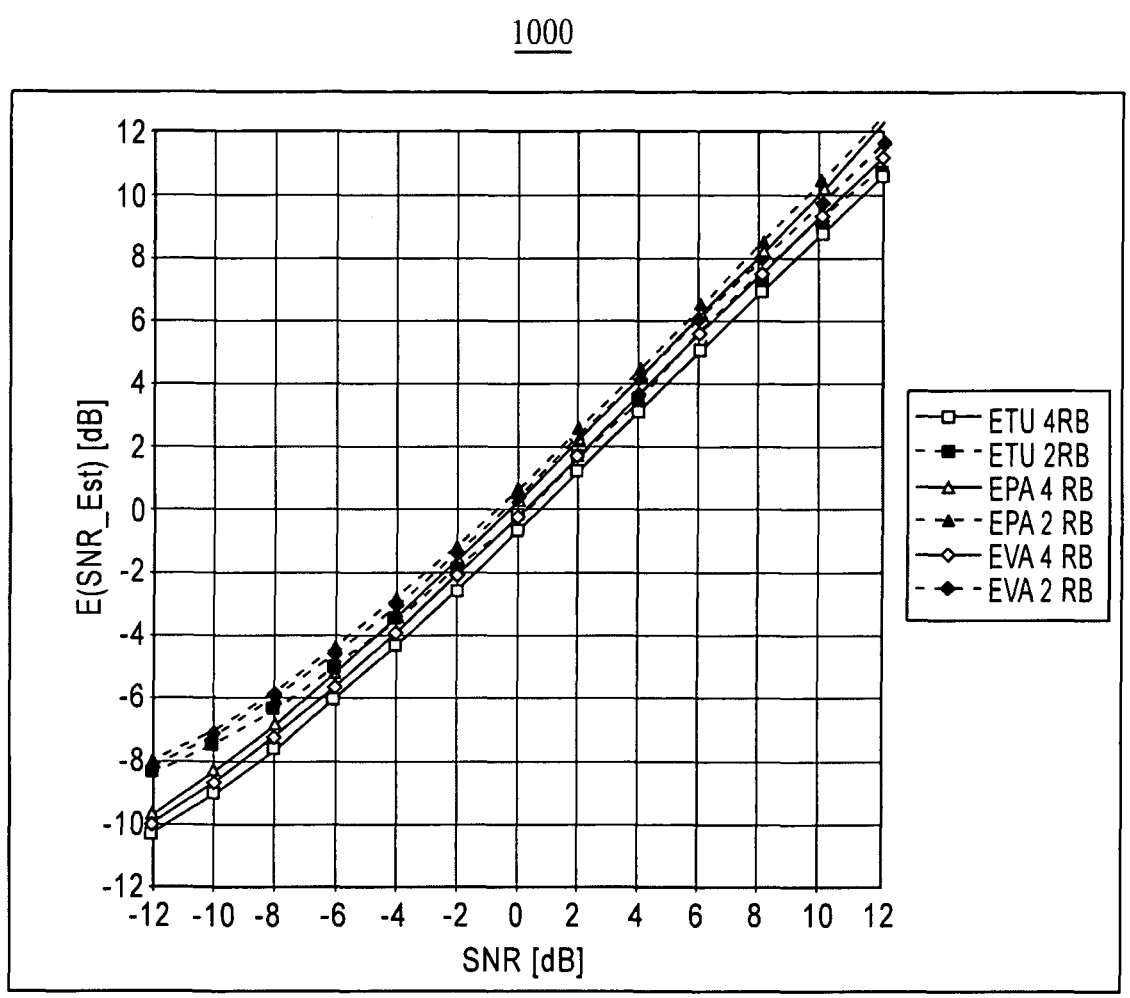
FIGS. 10A and 10B are charts to compare sounding errors using different minimum sounding reference signals bandwidths in accordance with an embodiment.
Figure 10B:
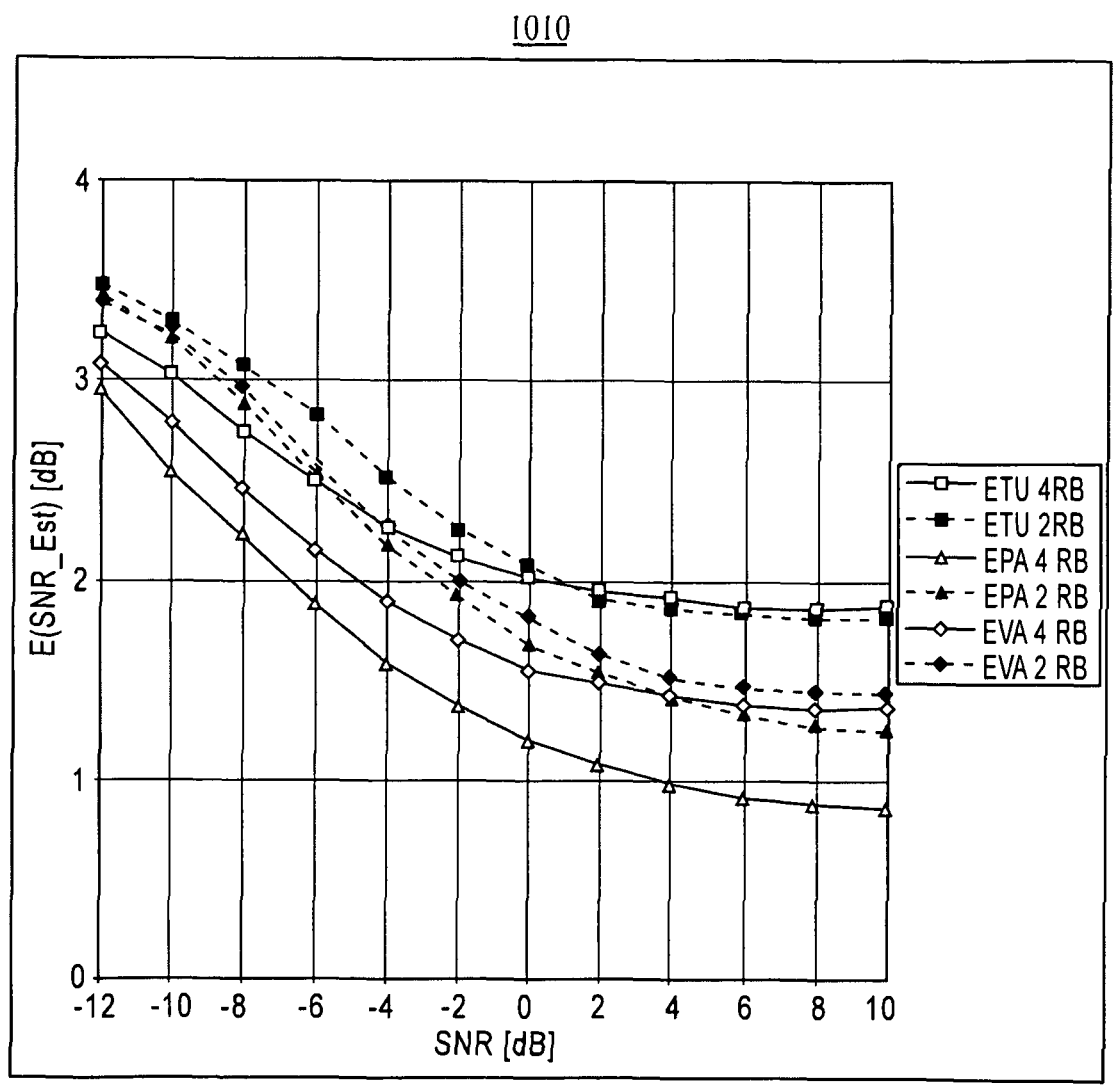

In another embodiment, a minimum SRS bandwidth is provided. For example, possible values for the minimum SRS bandwidth include 2 RBs and 4 RBs, as described in SRS bandwidth Table 400 of FIG. 4. Thus, the minimum SRS bandwidth is basically defined by sounding error rather than the channel bandwidth. As illustrated in FIGS. 10A and 10B, charts 1000 and 1010 compare the sounding error between the sounding reference signals of 2 and 4 RBs. In particular, chart 1000 in FIG. 10A corresponds to an expected value of a signal-to-interference plus noise ratio (SINR) estimator, whereas the chart 1010 in FIG. 10B corresponds to Standard deviation of signal-to-noise ratio (SNR) estimator as function of input SINR. These measurements generally suggest that even with the 3-dB higher power spectral density of a 2 RB sounding signal, there are no significant differences in sounding accuracy. This result may be due to the fact that with a 4 RB signal, a wider processing gain can be used to compensate lower power spectral density. Consequently, in one embodiment, the minimum SRS bandwidth may be 4 RBs to provide adequate sounding quality while reducing signal power requirements.

Figure 8:
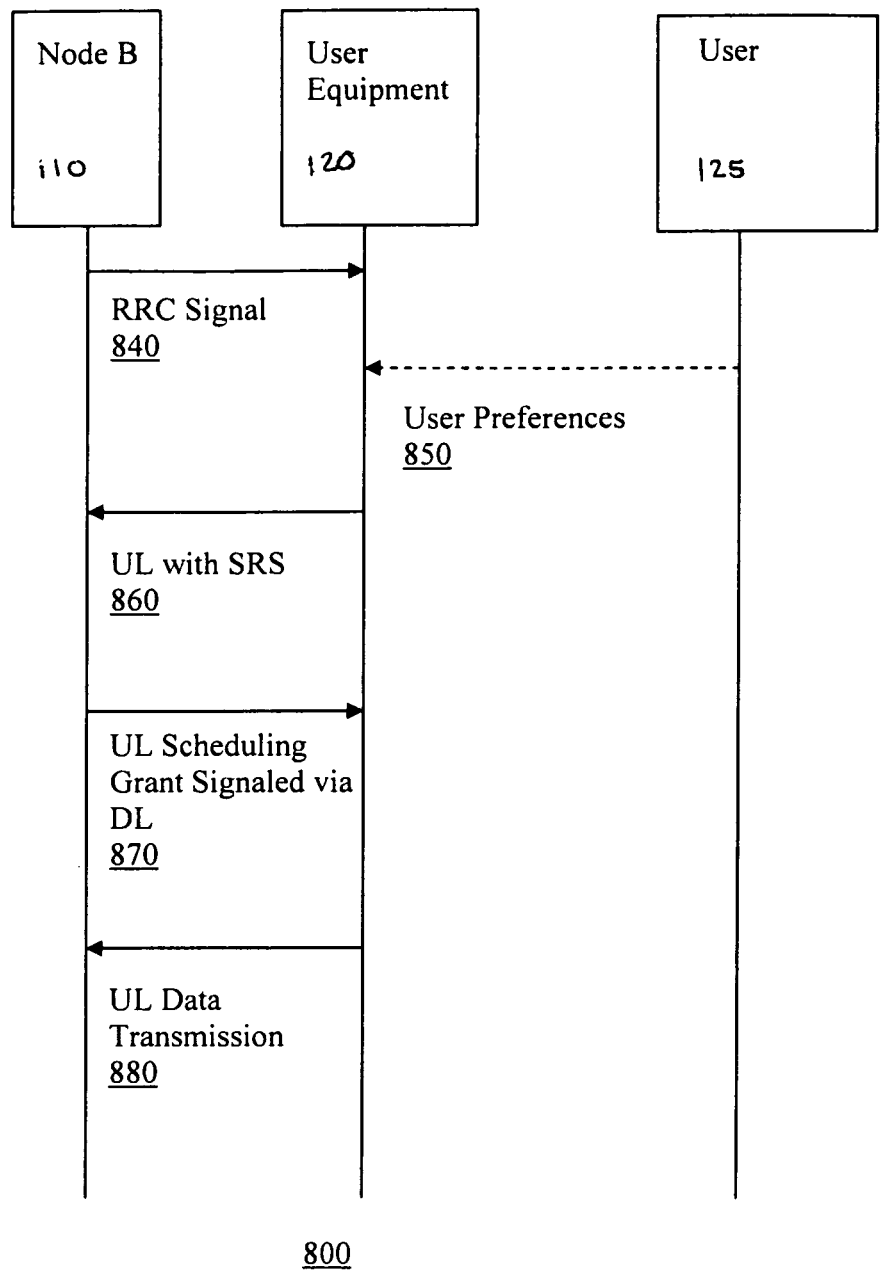
FIG. 8 is a process flow diagram for SRS bandwidth allocation in accordance with an embodiment.

Referring now to FIG. 8, a process flow diagram 800 in accordance with some of the embodiments is now presented. In particular, the flow diagram 800 illustrates the interaction between a node B 110, a UE 120, and a user 125. The UE 820 may receive radio resource control (RRC) signaling 840, which is SRS configuration signaling. This signaling can be either dedicated (UE specific) or broadcasted (cell specific system information). The UE 820 may optionally receive configuration data 850 from the user 125 describing desired configuration settings. The UE 820 uses the data 840 and 850 to create an uplink message 860 to the node B 110 containing a SRS allocation as disclosed herein. The node B 110 may then respond with the UL scheduling grant signaled via DL (e.g., PDCCH) 870 in reply to the request by the UE 120 in the uplink message 860. In response to the UL scheduling grant in the UL message 870, the UE 120 may forward to the node B 110 UL data transmission 880 for which the link adaptation/scheduling decisions have been done based on transmitted SRS. Alternatively, the node B 110 (e.g. eNB) may be configured to transmit a UL power control (PC) command or a timing adjustment command/update to the UE 120. However, the node B 110, based upon the SRS measurement, may be configured to not transmit if there is no reason for the signaling. It should be appreciated that these signals are transmitted using dynamic control signalling, for example DCI format 0, a dedicated RRC signaling.

Figure 9A:
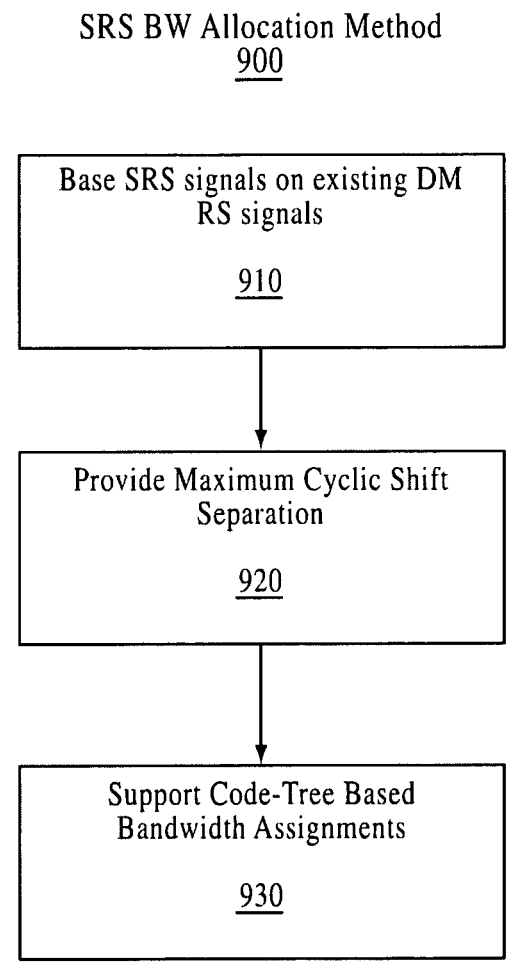
FIGS. 9A-9B is a method for SRS bandwidth allocation in accordance with an embodiment.
Figure 9B:
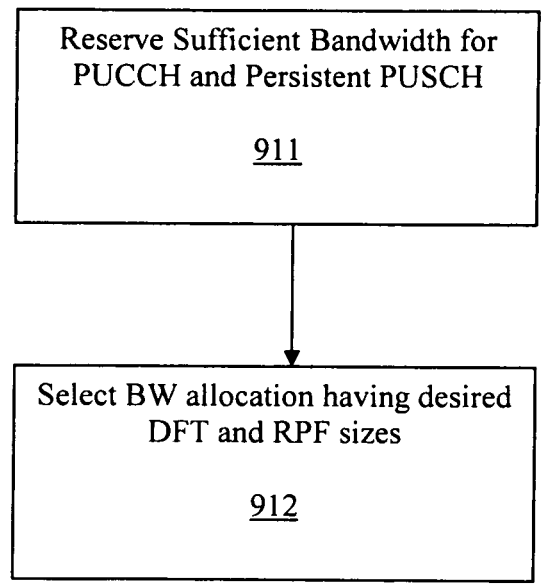

Referring now to FIGS. 9A-9B, a method 900 configured to provide the above-described SRS BW allocation is now described. In particular, the SRS BW allocation method 900 includes the step of basing the SRS signals on existing DM RS signals in step 910. Then, the SRS BW configuration can be configured in step 920 to provide for maximum cyclic shift separation. Then, the SRS BW configuration may be selected to support a code tree-based bandwidth assignment in step 930.

As depicted in FIG. 9B, the step of basing the SRS signals on existing DM RS signals in step 910 may include step 911 of reserving sufficient bandwidth for PUCCH and Persistent PUSCH. The step of basing the SRS signals on existing DM RS signals in step 910 may further include adapting the SRS bandwidth allocation according to desired DFT and repetition factor (RPF) sizes in step 912.

Figure 2:
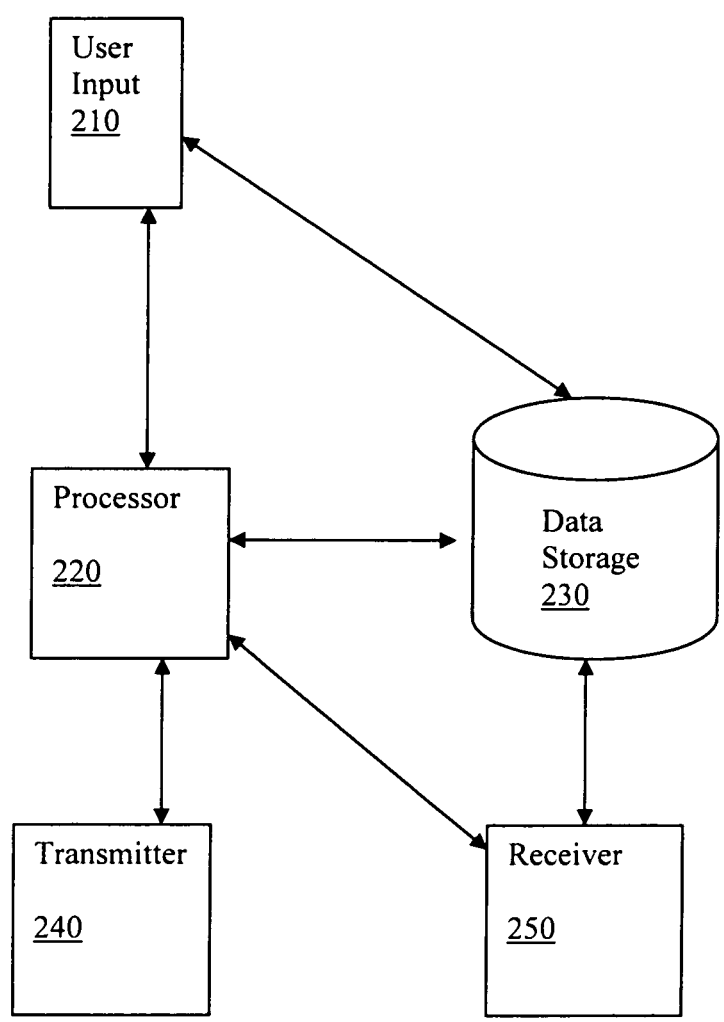
FIG. 2 is a high level schematic diagram of a user equipment in accordance with an embodiment.

Referring now to FIG. 2, a UE 120 in accordance with some of the embodiments is now provided. The UE 120 includes a processor 220, an interface (i.e. user input 210), a transmitter, 240, a receiver 250, and a data storage 230. Data related to the DM RS signals, a desired maximum cyclic shift separation, and details to support a code tree-based bandwidth assignment may be received from another source (i.e. base station) via the receiver 250 or may be inputted by the user interface 210 or both. This data received via the receiver or by the user interface 210 may then be stored in the storage device 230. The processor 220 can be configured to access the stored data in the storage device 230 to form an uplink message that includes the SRS. Furthermore, the storage device 230 may store additional data, as needed, for the processor 220 to determine sufficient bandwidth to reserve for PUCCH and Persistent PUSCH and the corresponding desired DFT and RPF sizes for the SRS bandwidth allocation. This additional data stored in the storage 230 may also be provided, for example, by a user interface 210 or may also be received from an outside source (i.e. base station) via a receiver 250, or both. The processor 220 may then form the uplink message that includes the SRS bandwidth allocation (using pre-determined cyclic shift) and forward this uplink message to a transmitter 240 for transmission to an outside device, such as a node B, as illustrated in FIG. 8.

However, as described above, the SRS transmission should not "puncture" the PUCCH region or otherwise attempt to transmit over a RB reserved for the PUCCH. Similarly, in certain cases the SRS may not puncture persistent PUSCH allocations. Accordingly, another embodiment relates to fulfilling the requirement that the SRS transmission should not puncture the PUCCH regions, even in cases in which the PUCCH bandwidth (BW), including persistent PUSCH, varies dynamically.

Figure 11:
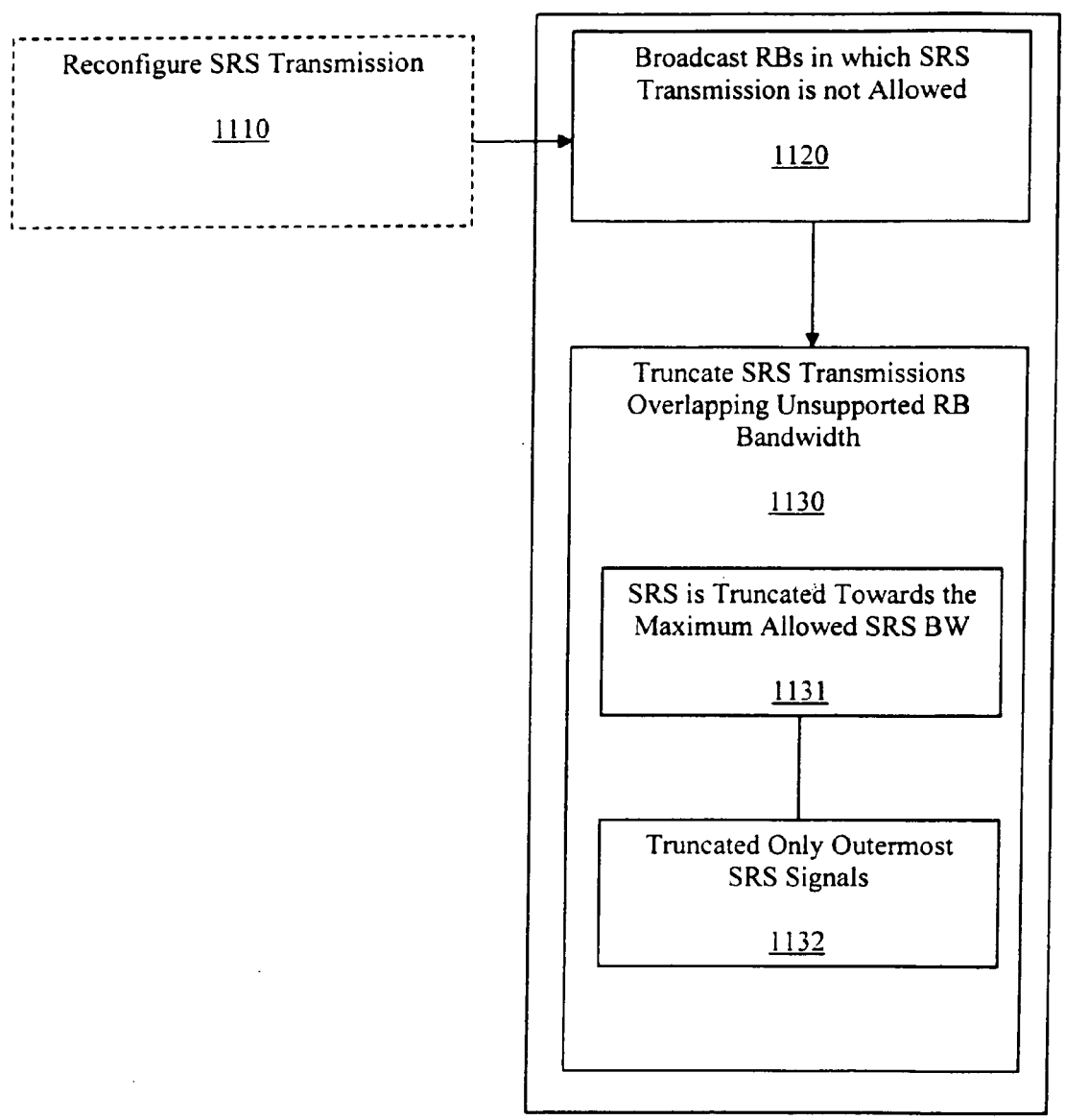
FIG. 11 is a method for handling of dynamically varying PUCCH bandwidth in accordance with an embodiment.

Referring now to FIG. 11, a method 1100 for handling dynamically varying PUCCH BW is presented. In step 1110, the SRS transmission may be deterred from puncturing the PUCCH regions by reconfiguring the SRS transmission in order to avoid PUCCH puncturing. Because SRS re-configuration typically takes a relatively long time and significant amount of signaling, especially in the case where a large number of UEs require SRS re-configuration, step 1110, as illustrated in FIG. 11, may not be sufficient with the dynamically varying PUCCH BW.

As a result, FIG. 11 illustrates the handling of dynamically varying PUCCH BW method 1100 by continuing to broadcast information about the RBs in which the SRS transmission is not allowed in step 1120. More specifically, the broadcast may specify that the SRS transmission is not allowed in the RBs allocated for the PUCCH region. Next, in step 1130, the SRS is truncated when the SRS overlaps the bandwidth that does not support the SRS transmission. Typically, a UE does the truncation in step 1130 autonomously using conventional techniques without requiring additional UE-specific signaling. The SRS is truncated towards the maximum allowed SRS BW in step 1131. The supported SRS BW options are listed in the rightmost column in the Table 500 described above in the discussion of FIG. 5. In one embodiment, only the outermost SRS signals are truncated, step 1132. As a consequence, the truncation impacts neither on the configured SRS BW (40 RBs, 20 RBs and 4 RBs in this case in the example of table 1200 depicted in FIG. 12 and described in greater detail below) nor the applied code-tree based bandwidth assignment.

In this way, handling of dynamically varying PUCCH BW in method 1100 provides a practical solution to address the case when PUCCH and/or persistent PUSCH BW changes dynamically. As described above, the SRS is truncated towards the maximum allowed SRS BW. The truncated SRS BW may be a member of existing DM RS set and the SRS BW is multiple of 4 RBs.

Figure 12:
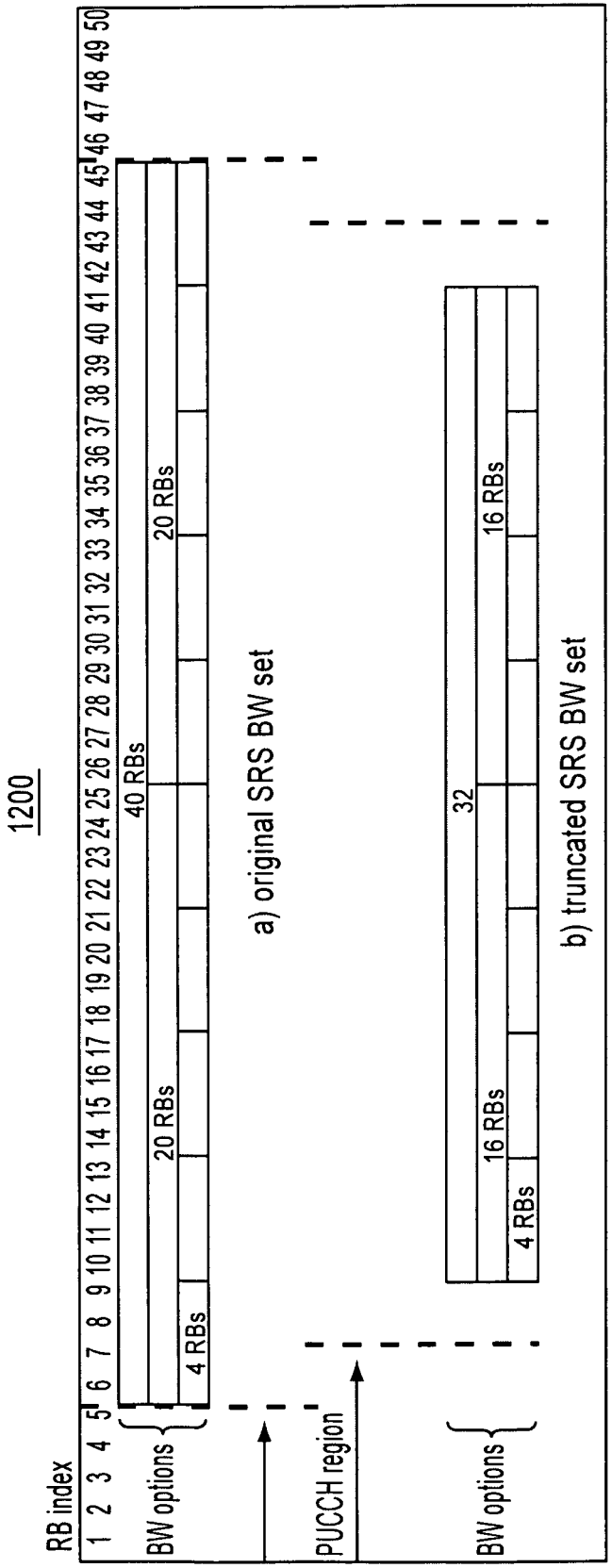
FIG. 12 is an exemplary table illustrating the handling of dynamically varying PUCCH bandwidth method of FIG. 11 in accordance with an embodiment.

Referring now to the table 1200 of FIG. 12, an example of the handling of dynamically varying PUCCH BW method 1100 is illustrated. The example of table 1200 assumes channel bandwidth of 10 MHz. As described above in SRS bandwidth table 300 in FIG. 3, when using the first bandwidth 310 scheme to reserve larger room for PUCCH and persistent PUSCH and by using one maximum SRS bandwidth of about 80% of the total the available BW, the SRS BW set includes the three SRS bandwidths of 40 RBs, 20 RBs and 4 RBs, and this SRS allocation set corresponds to the original SRS BW set 1210. In this example, in table 1200, truncation of the original BW set 1210 occurs because the PUCCH region 1220 overlaps with the SRS BW set 1210. To address this problem according to the handling of dynamically varying PUCCH BW method 1100, a truncated SRS BW set 1230. In particular, the SRS is truncated towards the maximum allowed SRS BW (32 in the depicted example of table 1200), according to step 1131, as listed in the rightmost column in the Table 500 of FIG. 5.

As illustrated in table 1200 of FIG. 12, the handling of dynamically varying PUCCH BW in method 1100 provides several benefits, including maintaining the code-tree based SRS bandwidth assignment, which is beneficial from the signaling point of view, such as in the situation of a frequency hopping SRS. Moreover, additional signaling burden is very marginal because the bandwidth needed for the signaling of the number of RBs that do not support the SRS transmission is quite small. Furthermore, the SRS/PUCCH handling may be implementation specific because an operator can control the area in which the SRS can be transmitted, for example, to optimize a persistent PUSCH, because relatively few items are specified in method 1200, such as the truncation rules and the applied code-tree based SRS assignment. Consequently, the resulting specification would be relatively easy to define (single SRS BW set/system BW).

Regarding to persistent PUSCH, the truncating of the SRS transmissions that overlapping unsupported RB bandwidth in step 1130 may include defining a region where SRS is not sent, towards the two ends of the BW. Thus, in general, any persistent allocations should be on that region and dynamic PUSCH UEs on the region where SRS is sent. Alternatively, in order to reduce the SRS overhead, there could be one bit in the UL grant to inform if SRS symbol is available for data transmission or if it used by SRS.

It should be readily appreciated that some of the embodiments may include a computer program embodied on a computer-readable medium, a compute-readable medium encoded with a computer program, or similar language may be embodied as a tangible data storage device storing computer software programs configured to control a processor, digital processing device, central processing unit (CPU), or the like, to perform one or more operations or execute one or more software instructions. A tangible data storage device may be embodied as a volatile memory device or a nonvolatile memory device, and/or a combination of a volatile memory device and a nonvolatile memory device. Accordingly, some of the embodiments provide for a computer-readable medium encoded with a computer program, where the computer program is configured to perform operations.

One having ordinary skill in the art will readily understand that some of the embodiments as discussed above may be practiced with steps in a different order, and/or with hardware elements in configurations which are different than those which are disclosed. Therefore, although some of the embodiments have been described based upon various configurations, it would be apparent to those of skill in the art that certain modifications, variations, and alternative constructions would be apparent, while remaining within the spirit and scope of some of the embodiments being described. In order to determine the metes and bounds of some of the embodiments, therefore, reference should be made to the appended claims.

It should be noted that reference throughout this specification to features, advantages, or similar language does not imply that all of the features and advantages that may be realized with some of the embodiments should be or are in any single embodiment. Rather, language referring to the features and advantages is understood to mean that a specific feature, advantage, or characteristic described in connection with an embodiment is included in at least one embodiment described above. Thus, discussion of the features and advantages, and similar language, throughout this specification may, but do not necessarily, refer to the same embodiment.

Furthermore, the described features, advantages, and characteristics of some of the embodiments may be combined in any suitable manner in one or more embodiments. One skilled in the relevant art will recognize that some of the embodiments can be practiced without one or more of the specific features or advantages of a particular embodiment. In other instances, additional features and advantages may be recognized in certain embodiments that may not be present in all embodiments.

The invention claimed is:

1. A method, comprising:

storing data related to reference signal sequences, to form a desired cyclic shift separation between reference signal sequences, and to support a tree-based bandwidth assignment, the data being received from a user interface or from a base station;

creating an uplink message to be transmitted to the base station, the created uplink message comprises a sounding reference signal based on the stored data;

receiving uplink scheduling grant signal via downlink from the base station in response to the transmission of the uplink message;

transmitting to the base station uplink data transmission responsive to the received uplink scheduling grant signal;

forming the sounding reference signal based on existing demodulation reference signals;

selecting the sounding reference signal to support the tree-based bandwidth assignment;

adapting the sounding reference signal to provide maximum cyclic shift separation;

reserving sufficient bandwidth at least for physical uplink control channel when forming the sounding reference signal based on existing demodulation reference signal signals;

selecting a bandwidth allocation based on discrete Fourier transforms and repetition factor sizes when forming the sounding reference signal based on existing demodulation reference signal signals; and configuring the maximum cyclic shift separation between eight cyclic shifts to result in a sounding reference signal sequence length divisible by eight when a bandwidth of the sounding reference signal is a multiple of four resource blocks.

2. The method according to claim 1, further comprising: determining sufficient bandwidth to reserve for the physical uplink control channel.

3. The method according to claim 2, further comprising: configuring at least two resource blocks to be reserved for the physical uplink control channel.

4. The method according to claim 1, wherein the demodulation reference signal signals comprises desired discrete Fourier transforms and repetition factor sizes, and
wherein the discrete Fourier transforms sizes are two, three, or five.

5. The method according to claim 1, further comprising: supporting the tree-based bandwidth assignment based on a selection of sounding reference signal bandwidths in which a larger bandwidth is evenly divisible by a smaller bandwidth.

6. The method according to claim 1, wherein the cyclic shift separation between possible cyclic shifts is maximized, and
wherein the cyclic shift is based on a sequence length and on a number of the possible cyclic shifts.

7. The method according to claim 6, wherein the cyclic shift is a cyclic shift indicator received from base station multiplied with a sequence length and divided with the number of possible cyclic shifts, and
wherein the number of possible cyclic shifts is eight.

8. The method according to claim 1, wherein a bandwidth of the sounding reference signal comprises a minimum of four resource blocks.

9. The method according to claim 1, further comprising: calculating an actual amount of cyclic shift in symbols using equation 1, which relates to a time domain generation of the cyclic shifts, $$\text{Cyclic\_shift\_symbols\_SRS} = \frac{\text{cyclic\_shift\_value\_SRS} \times \text{SRS\_length}}{8}$$

wherein possible cyclic shift values (cyclic_shift_value_SRS) are, 0, 1, . . . , and 7.

10. The method according to claim 9, further comprising: generating corresponding cyclic shifts by utilizing basic properties of discrete Fourier transformation;
generating a cyclic shift of l by multiplying the nth element of the sequence discrete Fourier transformation with $\exp(j2\pi \ln/N)$, where $j=\text{sqrt}(-1)$ and N is the length of sequence; and
realizing the cyclic shift of the equation 1 in frequency domain by multiplying the nth element of the SRS sequence discrete Fourier transformation with $\exp(j2\pi n \times \text{Cyclic\_shift\_symbols\_SRS}/\text{SRS\_length}) = \exp(j2\pi n \times \text{cyclic\_shift\_value\_SRS}/8)$.

11. An apparatus, comprising:
a memory configured to store data related to reference signal sequences, to form a desired cyclic shift separation between reference signal sequences, and to support a tree-based bandwidth assignment, the data being received from a user interface or from a base station;
a transmitter configured to transmit to the base station a created uplink message comprising a sounding reference signal based on the stored data;
a receiver configured to receive uplink scheduling grant signal via downlink from the base station, wherein the transmitter is further configured to transmit to the base station uplink data transmission responsive to the received uplink scheduling grant signal; and
a processor configured to
form the sounding reference signal based on existing demodulation reference signal,
select the sounding reference signal to support the tree-based bandwidth assignment,
adapt the sounding reference signal to provide maximum cyclic shift separation,
reserve sufficient bandwidth for physical uplink control channel when the sounding reference signal is formed based on existing demodulation reference signal signals;
select bandwidth allocation based on a discrete Fourier transforms and repetition factor sizes when the sounding reference signal is formed based on existing demodulation reference signal signals; and
maximize cyclic shift separation between eight cyclic shifts to result in a sounding reference signal sequence length divisible by eight when a bandwidth of the sounding reference signal is a multiple of four resource blocks.

12. The apparatus according to claim 11, wherein the processor is further configured to determine sufficient bandwidth to reserve for the physical uplink control channel.

13. The apparatus according to claim 12, wherein two resource blocks are reserved for the protocol uplink control channel.

14. The apparatus according to claim 11, wherein the demodulation reference signal signals comprises desired discrete Fourier transforms and repetition factor sizes, and
wherein the discrete Fourier transforms sizes are two, three, or five.

15. The apparatus according to claim 11, wherein the processor is further configured to support the tree-based bandwidth assignment based on a selection of sounding reference signal bandwidths in which a larger bandwidth is evenly divisible by any smaller bandwidth.

16. The apparatus according to claim 11, wherein the cyclic shift separation between possible cyclic shifts is maximized, and
wherein the cyclic shift is based on a sequence length and on a number of the possible cyclic shifts.

17. The apparatus according to claim 16, wherein the cyclic shift is a cyclic shift indicator received from a base station multiplied with a sequence length and divided with the number of the possible cyclic shifts, and
wherein the number of possible cyclic shifts is eight.

18. The apparatus according to claim 11, wherein a bandwidth of the sounding resource signal comprises a minimum of four resource blocks.

19. The apparatus according to claim 11, further comprising:
a calculator configured to calculate an actual amount of cyclic shift in symbols using equation 1, which relates to a time domain generation of the cyclic shifts, $$\text{Cyclic\_shift\_symbols\_SRS} = \frac{\text{cyclic\_shift\_value\_SRS} \times \text{SRS\_length}}{8}$$

wherein possible cyclic shift values (cyclic_shift_value_SRS) are, 0, 1, . . . , and 7.

20. The apparatus according to claim 11, further comprising:
- a generator configured to generate corresponding cyclic shifts by utilizing basic properties of discrete Fourier transformation;
- another generator configured to generate a cyclic shift of 1 by multiplying the nth element of the sequence discrete Fourier transformation with $\exp(j2\pi\ ln/N)$, where $j = \mathrm{sqrt}(-1)$ and N is the length of sequence; and
- a realizing unit configured to realize the cyclic shift of the equation 1 in frequency domain by multiplying the nth element of the SRS sequence discrete Fourier transformation with $\exp(j2\pi n \times \mathrm{Cyclic\_shift\_symbols\_SRS}/\mathrm{SRS\_length}) = \exp(j2\pi n \times \mathrm{cyclic\_shift\_value\_SRS}/8)$.

21. An apparatus, comprising:
- storing means for storing data related to reference signal sequences, to form a desired cyclic shift separation between the reference signal sequences, and to support a tree-based bandwidth assignment, the data being received from a user interface or from a base station;
- transmitting means for transmitting to the base station a created uplink message comprising a sounding reference signal based on the stored data;
- receiving means for receiving uplink scheduling grant signal via downlink from the base station, wherein the transmitting means for transmitting transmits to the base station uplink data transmission responsive to the received uplink scheduling grant signal;
- means for forming the sounding reference signal based on existing demodulation reference signals;
- means for selecting the sounding reference signal to support the tree-based bandwidth assignment;
- means for adapting the sounding reference signal to provide maximum cyclic shift separation;
- means for reserving sufficient bandwidth at least for physical uplink control channel when forming the sounding reference signal based on existing demodulation reference signal signals;
- means for selecting a bandwidth allocation based on discrete Fourier transforms and repetition factor sizes when forming the sounding reference signal based on existing demodulation reference signal signals; and
- means for configuring the maximum cyclic shift separation between eight cyclic shifts to result in a sounding reference signal sequence length divisible by eight when a bandwidth of the sounding reference signal is a multiple of four resource blocks.

22. A computer program embodied on a non-transitory computer-readable medium, the computer program being configured to control a process to perform a method, the method comprising:
- storing data related to reference signal sequences, to form a desired cyclic shift separation between reference signal sequences, and to support a tree-based bandwidth assignment, the data being received from a user interface or from a base station;
- creating an uplink message to be transmitted to the base station comprising a sounding reference signal based on the stored data;
- receiving uplink scheduling grant signal via downlink from the base station in response to the transmission of the uplink message;
- transmitting to the base station uplink data transmission responsive to the received uplink scheduling grant signal;
- forming the sounding reference signal based on existing demodulation reference signals;
- selecting the sounding reference signal to support the tree-based bandwidth assignment;
- adapting the sounding reference signal to provide maximum cyclic shift separation;
- reserving sufficient bandwidth at least for physical uplink control channel when forming the sounding reference signal based on existing demodulation reference signal signals;
- selecting a bandwidth allocation based on discrete Fourier transforms and repetition factor sizes when forming the sounding reference signal based on existing demodulation reference signal signals; and
- configuring the maximum cyclic shift separation between eight cyclic shifts to result in a sounding reference signal sequence length divisible by eight when a bandwidth of the sounding reference signal is a multiple of four resource blocks.

* * * * *